George W. Mork.
INVENTOR.

BY Hoar + Ruhloff
ATTORNEYS.

George W. Mork
INVENTOR.
BY Hoar & Ruhloff
ATTORNEYS.

Patented Mar. 27, 1945

2,372,220

UNITED STATES PATENT OFFICE 2,372,220

TRACTOR PROPELLED IMPLEMENT

George W. Mork, South Milwaukee, Wis., assignor to Bucyrus Erie Company, South Milwaukee, Wis., a corporation of Delaware Application February 12, 1944, Serial No. 522,042

7 Claims. (Cl. 214—139)

My invention relates to new and useful improvements in tractor propelled and operated implements, and more particularly horizontal platform-lifts for tractors.

My invention is adapted to be attached to conventional tractors, either wheeled or creeping-traction, preferably the latter. The implement proper is mounted on the ends of two arms, which straddle the tractor laterally, are supported by the main tractor frame and/or the traction frames, and extend in front of or behind the tractor. Power means are provided for raising and lowering the implement proper, it being inserted under some object such as a small loaded platform on legs.

As more specifically shown and described herein, the implement and tractor constitute together a horizontal platform-lift.

The principal object of my invention is to design such a platform-lift for attaching to a conventional tractor.

More specifically it is my object to design such a platform-lift as alternative equipment to the push scoop described and shown in my copending Patent No. 2,345,620, granted April 4, 1944, it being my still more specific object to accomplish the interchange of these two tractor-attachments, with the use of a minimum number of alternative parts.

A still further object is to design a new stop for use not only with my present variants, but also with the scoop of my above-identified copending patent.

In addition to this object, I have worked out a number of novel and useful details, which will be readily evident as the description progresses.

My invention consists in the novel parts and in the combination and arrangement thereof, which are defined in the appended claims, and of which two embodiments are exemplified in the accompanying drawings, which are hereinafter particularly described and explained.

Throughout the description, the same reference number is applied to the same member or to similar members.

Figure 1:
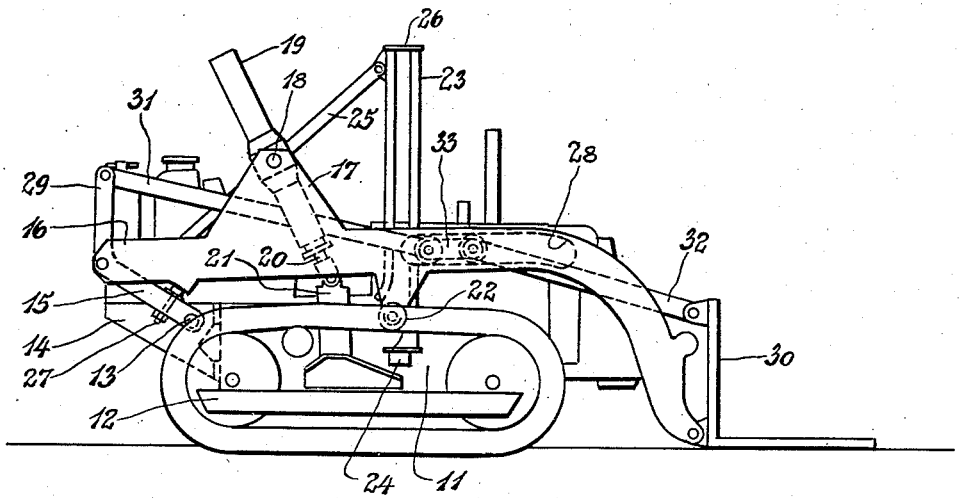
Figure 1 is a side elevation of one variant of my invention in lowered position.
Figure 2:
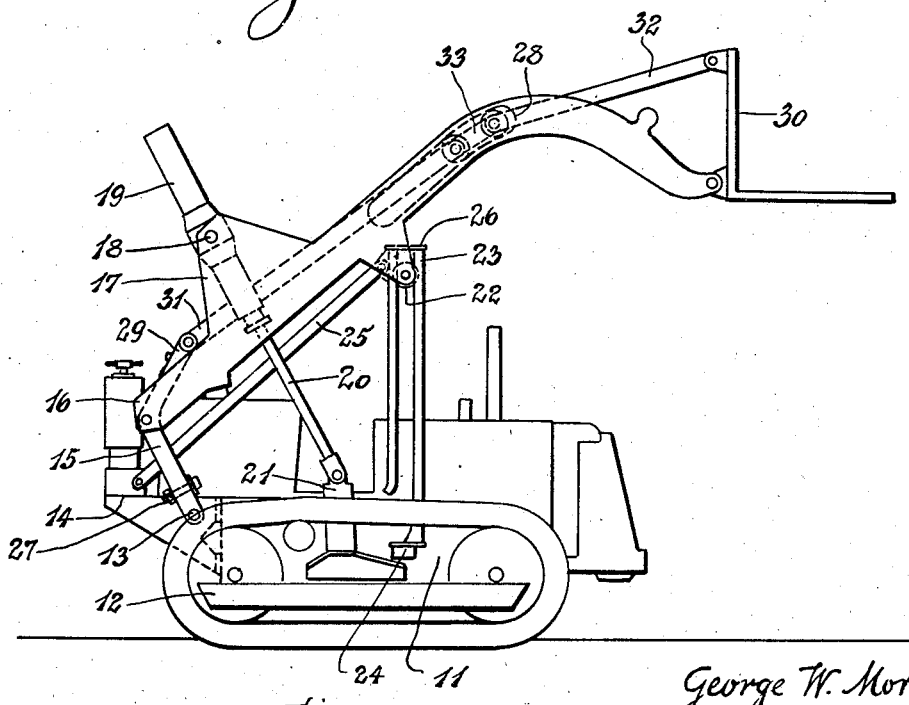
Figure 2 is a side elevation of that variant in raised position.

Referring now to Figures 1 and 2, we see that 11 is a conventional tractor, mounted on creeping traction frames 12. The details of the tractor form no part of my invention, and are immaterial except so far as hereinafter discussed.

A cross-shaft 13 is journaled in brackets 14, which in turn are rigidly secured to the main tractor frame 11.

Keyed to shaft 13 are two upwardly projecting links 15, each of which supports pivotally at its upper rear end the rear end of one of push-arms 16; but this is merely the preferable means of mounting these links. Intermediate the ends of each push-arm 16 are two upstanding brackets 17, in which are journaled the trunnions 18 of a fluid pressure cylinder 19. These cylinders are preferably double-acting.

The piston rod 20 of each cylinder 19 is pivoted to a bracket 21, which is secured to one of the traction frames in a manner which will be later described herein.

Carried by each push-arm 16 is a roller 22, or other convenient guide, which slides in a vertical guideway 23 supported by the main tractor frame in any convenient manner. As shown, the guideway 23 is secured to a bracket 24 on the main frame, and braced by a back brace 25. The two guide-ways 23 are tied together at their tops by a cross-brace 26.

An adjustable stop 27 is carried by each link 15, to limit the downward motion of the rear end of the corresponding push-arm 16. Preferably, but not necessarily, this stop is so carried, and bears against push-arm 16.

This arrangement of the stop 27 is preferable to that shown and described in my above-identified copending patent, for the following reason. It serves equally well to limit the descent of the rear end of the push arms; and yet, when they have reached the limit position, eliminates strain by still permitting a slight rotation of push-arms 16 and links 15 as one unit above shaft 13.

In general, and except as hereinafter described, this first variant of my present invention operates like the push-scoop of my above-identified copending patent, to which reference is hereby made for fuller particulars.

By adding a roller runway 28 on the inside face of each push-arm 16, identical push-arms can be employed for both push-scoops and my present invention.

Links 15 must, however, be built with an extended portion 29. An L-shaped platform pick-up member 30 is substituted for the scoop, and there are added links 31 and 32, and roller carriage 33.

By comparing Figure 1 with Figure 2, it will be seen that the bottom of L-shaped member 30 is maintained substantially horizontal at all elevations.

Figure 3:
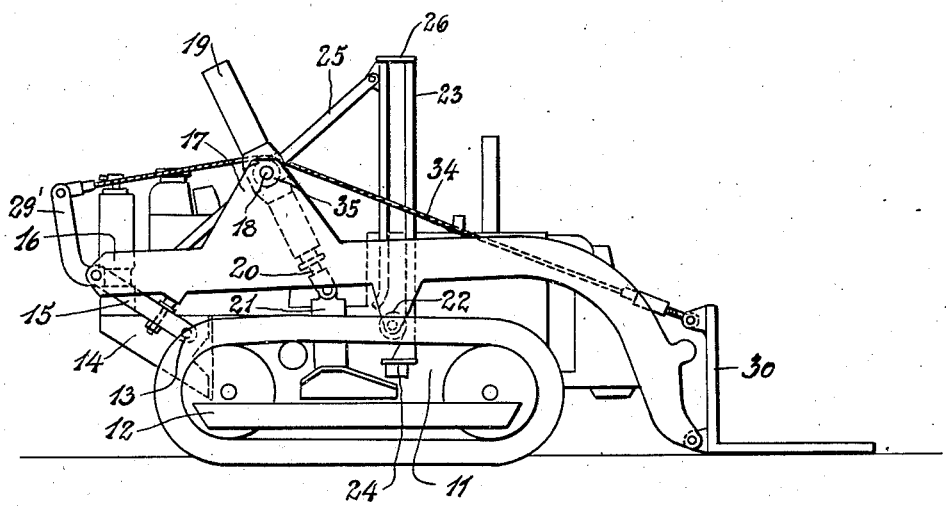
Figure 3 is a side elevation of a second variant of my invention in lowered position.
Figure 4:
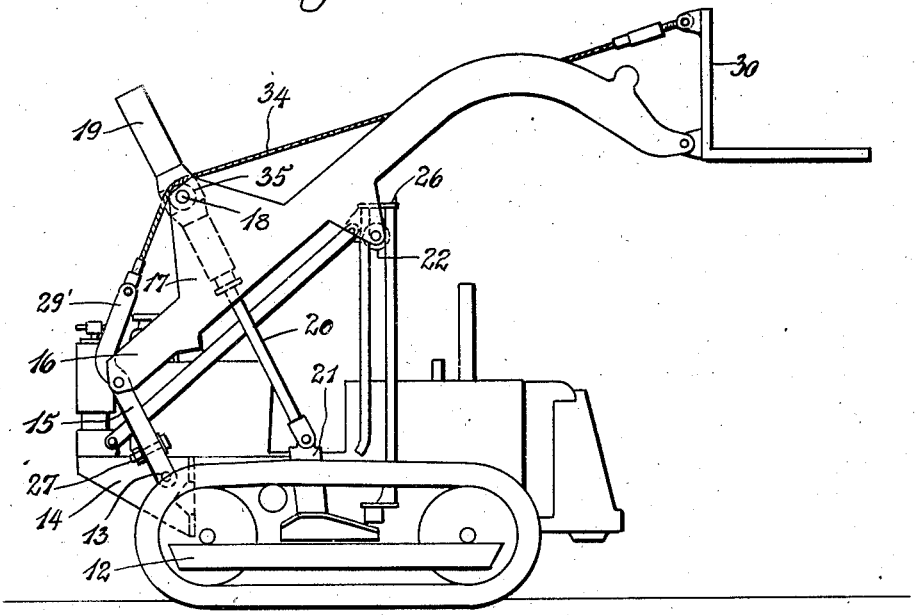
Figure 4 is a side elevation of this second variant in raised position.

Turning now to Figures 3 and 4, which portray my second variant, we see that this second variant is identical to the first through reference-number 27.

However, there is no runway 28, and extension 29 on link 15 is differently inclined than extension 29 of the first variant.

The same L-shaped member 30 is employed; but it is oriented by means of a cable 34, on each side, extending from extension 29, over a sheave 35 on trunnions 18, to L-shaped member 30.

Having now described and illustrated two forms of my invention, I wish it to be understood that my invention is not to be limited to the specific forms or arrangement of parts herein described and shown, except insofar as required by limitations in my claims.

I claim:

1. In a material-handling implement, for attachment to a tractor which has a main frame and two traction frames pivotally attached thereto, the combination of: two arms; and the implement proper, pivotally supported by the arms on a horizontal pivot; each arm being supported and manipulated by the following described mechanism: a link, pivotally attached to the main tractor frame near the rear thereof and projecting upwardly therefrom, and pivotally attached to the arm, and so disposed that at some intermediate position of this link its line of action will intersect the line of pivotal attachment of the traction frames to the main tractor frame; a substantially vertical guideway, carried by the main tractor frame near the front thereof; guide means, carried by the arm, to engage the guideway; and a cylinder-piston assembly, pivotally attached to the arm intermediate the point of attachment of the link and the guide means, and pivotally supported by the traction frame; and means for maintaining the implement proper at substantially the same inclination throughout its cycle.

2. An implement according to claim 1, further characterized by the fact the last mentioned means is so connected to the rear link, the arm, and the implement proper, that relative angular displacement of the rear link and the arm imparts the desired relative angular displacement of the implement proper and the arm.

3. In a material-handling implement, for attachment to a tractor, the combination of: two arms; the implement proper, pivotally supported by the arms on a horizontal pivot; twin links, pivotally attached to the tractor near the rear thereof and projecting upwardly therefrom, each link being pivotally attached to its arm at an intermediate point on the link; means for raising and lowering the arms; means to constrain the arms to follow a predetermined path during raising and lowering; and means connecting the upper portion of each rear link, via its arm, to the implement proper, whereby the relative angular displacement of the rear links and the arms imparts substantially constant inclination to the implement proper throughout its cycle.

4. An implement according to claim 3, wherein the last-named means extends from the upper portion of each rear link, to a guide on its arm, and thence to the upper portion of the implement proper.

5. An implement according to claim 3, wherein the last-named means comprises: a slide on each arm; a carriage, slidable in the slide; a link, pivotally connected to the upper portion of each rear link and to the carriage; and a third link, pivotally connected to the carriage and to the upper portion of the implement proper.

6. An implement according to claim 3, wherein the last-named means comprises on each side: a sheave, journally supported on the arm; and a flexible element extending from the upper portion of the rear link, over the sheave, to the upper portion of the implement proper.

7. In a material-handling implement, for attachment to a tractor, the combination of: two arms; the implement proper, supported by the arms; twin links, pivotally attached to the tractor near the rear thereof and projecting upwardly therefrom, each link being pivotally attached to its arm; means for raising and lowering the arms; means to constrain the arms to follow a predetermined path during raising and lowering; and a stop carried by each rear link, engageable with its arm, and adapted to limit relative angular displacement of the rear link and its arm, when the arm is in lowered position.

GEORGE W. MORK.